(12) United States Patent
Kim (10) Patent No.: US 10,585,303 B2
(45) Date of Patent: Mar. 10, 2020

(54) DISPLAY DEVICE WITH IMPROVED TORSIONAL RIGIDITY

(71) Applicant: LG DISPLAY CO., LTD., Seoul (KR)

(72) Inventor: HyunJung Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/184,682

(22) Filed: Nov. 8, 2018

(65) Prior Publication Data

US 2019/0146263 A1    May 16, 2019

(30) Foreign Application Priority Data

Nov. 14, 2017  (KR) .................. 10-2017-0151862

(51) Int. Cl.
*G02F 1/1333* (2006.01)
*G02F 1/1335* (2006.01)

(52) U.S. Cl.
CPC .. *G02F 1/133308* (2013.01); *G02F 1/133603* (2013.01); *G02F 1/133606* (2013.01); *G02F 1/133608* (2013.01); *G02F 2001/13332* (2013.01); *G02F 2001/133314* (2013.01); *G02F 2001/133317* (2013.01); *G02F 2001/133322* (2013.01)

(58) Field of Classification Search
CPC ... G02F 1/133308; G02F 2001/133314; G02F 2001/133317; G02F 2201/46; G02F 2001/133322; G02F 1/133603; G02F 1/133608; G02F 2001/13332; G02F 1/133606
See application file for complete search history.

(56) References Cited

U.S. PATENT DOCUMENTS

| | | | |
|---|---|---|---|
| 2008/0225556 A1* | 9/2008 | Chen ................. | G02F 1/133608 362/634 |
| 2011/0001891 A1* | 1/2011 | Yoshikawa ....... | G02F 1/133608 348/790 |
| 2011/0242434 A1* | 10/2011 | Hisada .............. | G02F 1/133608 348/739 |
| 2014/0293184 A1* | 10/2014 | Sugamura ......... | G02F 1/133308 349/58 |
| 2019/0100153 A1* | 4/2019 | Oshima ................. | B60K 35/00 |

* cited by examiner

*Primary Examiner* — James Wu
(74) *Attorney, Agent, or Firm* — Seed IP Law Group LLP (57) ABSTRACT

A display improves the flatness of the vertical side portions of the cover bottom and supplements torsional rigidity, thereby preventing light leakage and also improving display performance, and has an improved structure, which, even if a torsion phenomenon occurs in any one portion of chassis structures according to the fastening of the chassis structures, is capable of preventing the torsion phenomenon from affecting other portions.

13 Claims, 11 Drawing Sheets

DISPLAY DEVICE WITH IMPROVED TORSIONAL RIGIDITY

CROSS REFERENCE TO RELATED APPLICATION

This application claims priority from Korean Patent Application No. 10-2017-0151862, filed on Nov. 14, 2017, which is hereby incorporated by reference for all purposes as if fully set forth herein.

BACKGROUND

Technical Field

Embodiments disclosed herein relate to a display device.

Description of the Related Art

As society develops into an information society, demand is increasing for display devices in various forms for displaying images. In recent years, various display devices, such as a liquid crystal display device, a plasma display device, and an organic light-emitting diode display device, have been utilized.

Among them, the liquid crystal display device controls an electric field applied to the liquid crystal layer of the display panel so as to cause light, emitted from a backlight unit to the display panel, to be transmitted through the array of liquid crystals while changing the array of liquid crystals, thereby displaying an image.

The backlight unit and the display panel of such a liquid crystal display device are coupled and protected by a plurality of chassis structures.

A cover bottom, which is a kind of chassis structure, is located under the display panel so as to protect the backlight unit, which is coupled to other structures so as to form an overall chassis structure.

In the process of coupling the cover bottom and the other structures, stress may be generated in a coupling portion of the cover bottom due to the coupling, and the coupling portion of the cover bottom may be deformed locally due to such stress.

In this case, the overall flatness of the cover bottom is reduced, and a light leakage phenomenon occurs, in which light emitted from the backlight unit leaks.

BRIEF SUMMARY

In view of the foregoing, an aspect of embodiments of the present disclosure is to provide a display device having an improved structure, which supplements the torsional rigidity of a cover bottom.

Another aspect of embodiments of the present disclosure is to provide a display device having an improved structure, which, even if a torsion phenomenon occurs in any one portion of chassis structures according to the fastening of the chassis structures, is capable of preventing the torsion phenomenon from affecting other portions.

Still another aspect of embodiments of the present disclosure is to provide a display device having a structure, which, even if a torsion phenomenon is generated in any one portion of chassis structures due to fastening of the chassis structures, is capable of preventing the torsion phenomenon from affecting display performance or reducing such effect.

Yet another aspect of embodiments of the present disclosure is to provide a display device capable of improving the overall flatness of the vertical side portions of the cover bottom.

The aspect of the present disclosure is not limited thereto, and other unmentioned aspects of the present disclosure may be clearly appreciated by those skilled in the art from the following descriptions.

In order to achieve the above-mentioned aspects, embodiments of the present disclosure provide a display device having a slit hole around a fastening hole of a cover bottom.

Further, embodiments of the present disclosure provide a display device to which a reinforcing frame having an improved structure for supplementing the torsional rigidity of a cover bottom is applied.

According to embodiments of the present disclosure, even if a torsion phenomenon occurs in any one portion of chassis structures due to the fastening of the chassis structures, it is possible to prevent the torsion phenomenon from affecting other portions.

According to embodiments of the present disclosure, it is also possible to improve the flatness of the vertical side portions of the cover bottom and to supplement torsional rigidity, thereby preventing light leakage and also improving display performance.

According to embodiments of the present disclosure, it is possible to improve the structural stability of a display device by making the display device include a rigid fastening structure.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which.

DETAILED DESCRIPTION

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1:
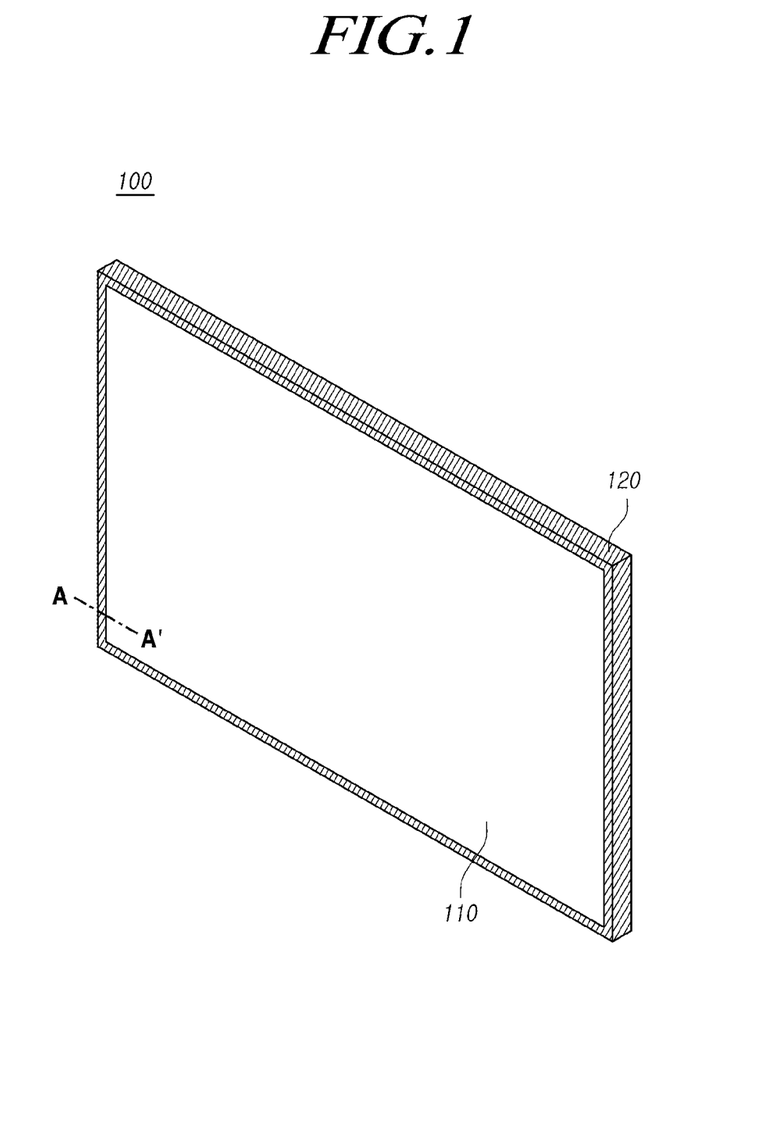
FIG. 1 is a perspective view illustrating a display device according to embodiments of the present disclosure.
Figure 2:
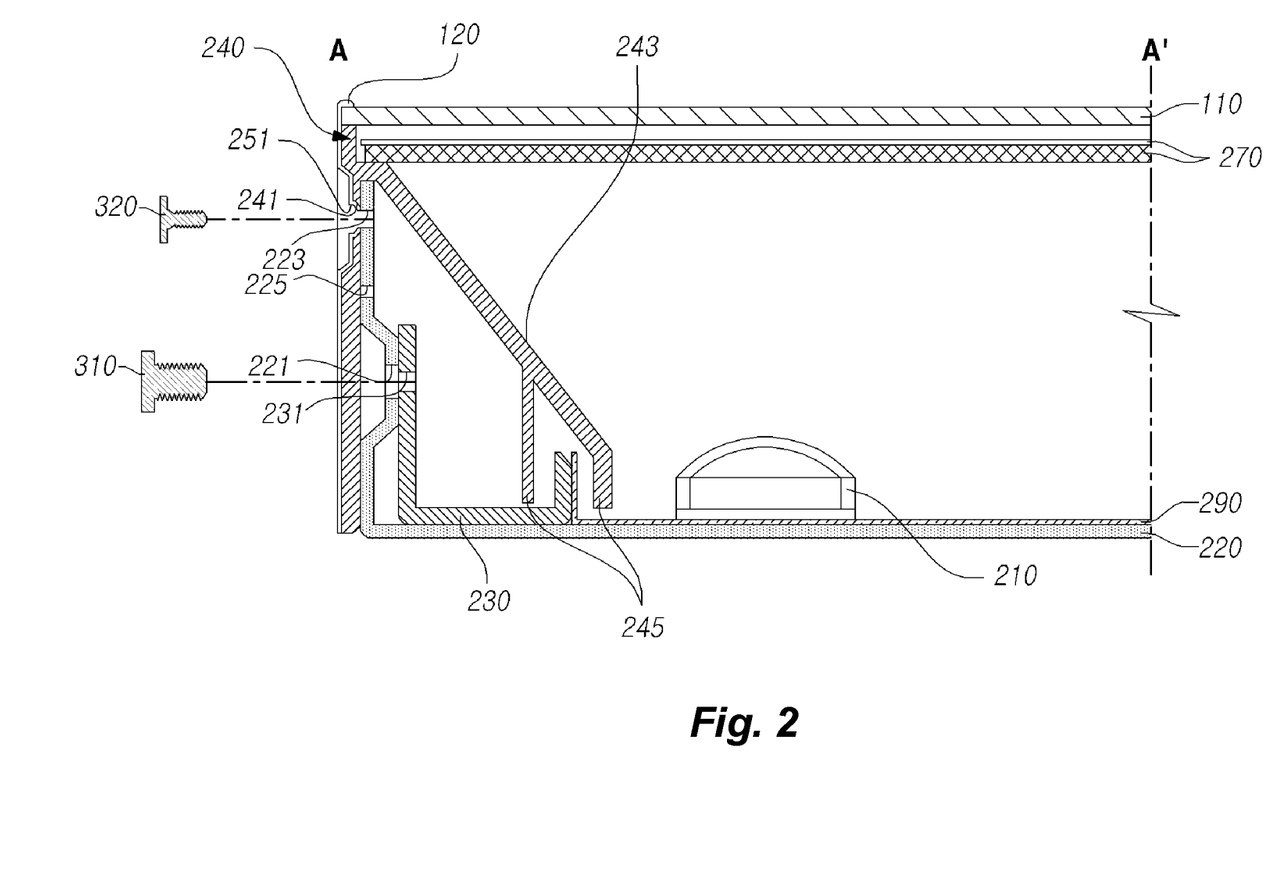
FIG. 2 is an exemplary view illustrating a cross section taken along line A-A in FIG. 1.
Figure 3:
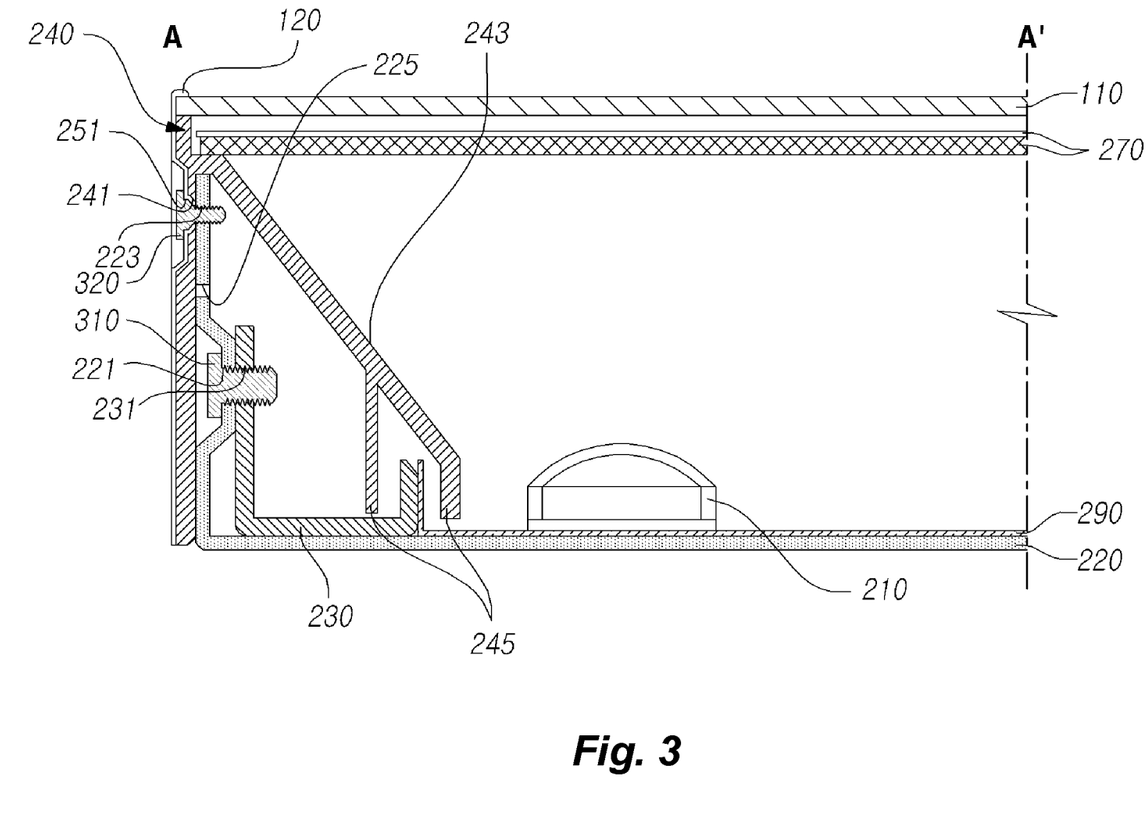
FIG. 3 is an exemplary view illustrating a cross section taken along line A-A in FIG. 1 in the state in which a fastening member is fastened.
Figure 4:
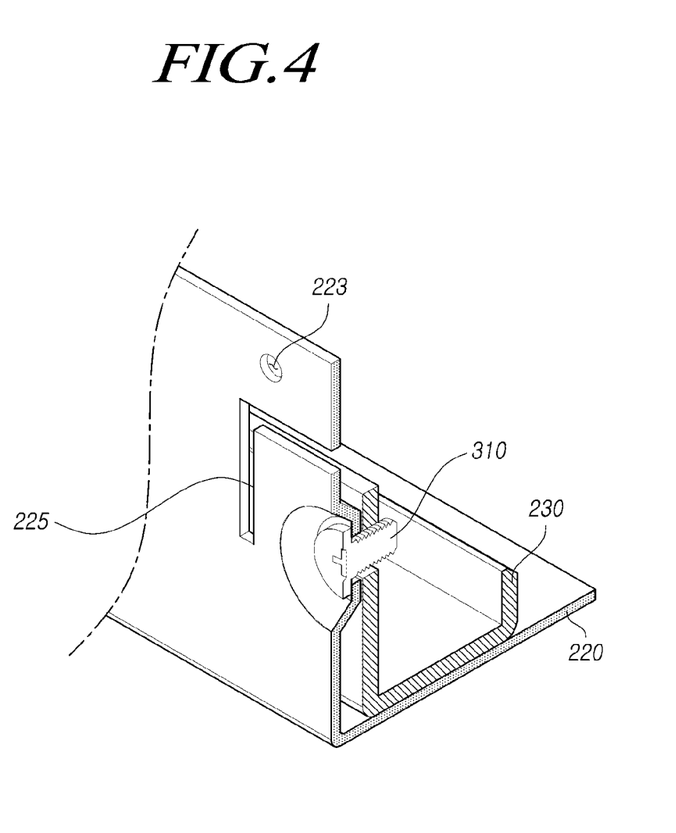
FIG. 4 is an exemplary view illustrating a cut surface of a portion of a display device according to embodiments of the present disclosure.
Figure 5:
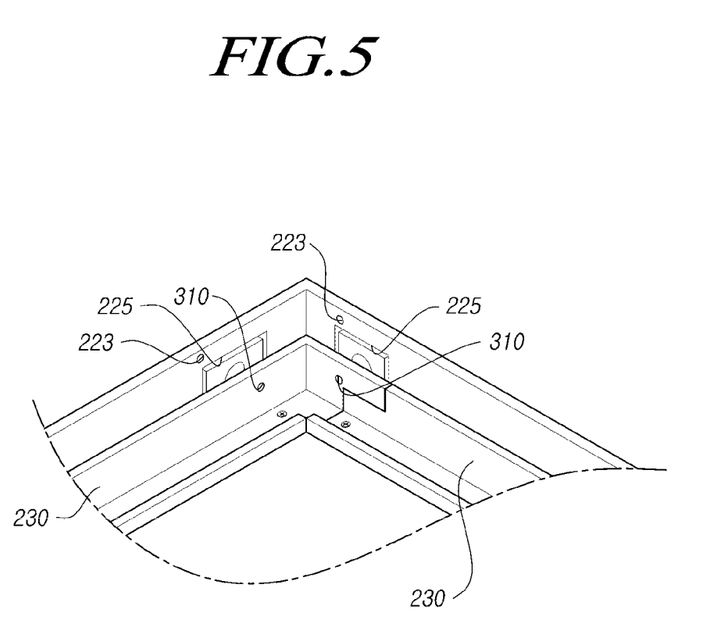
FIG. 5 is an exemplary view illustrating an inner portion of a partial region of a display device according to embodiments of the present disclosure.
Figure 6:
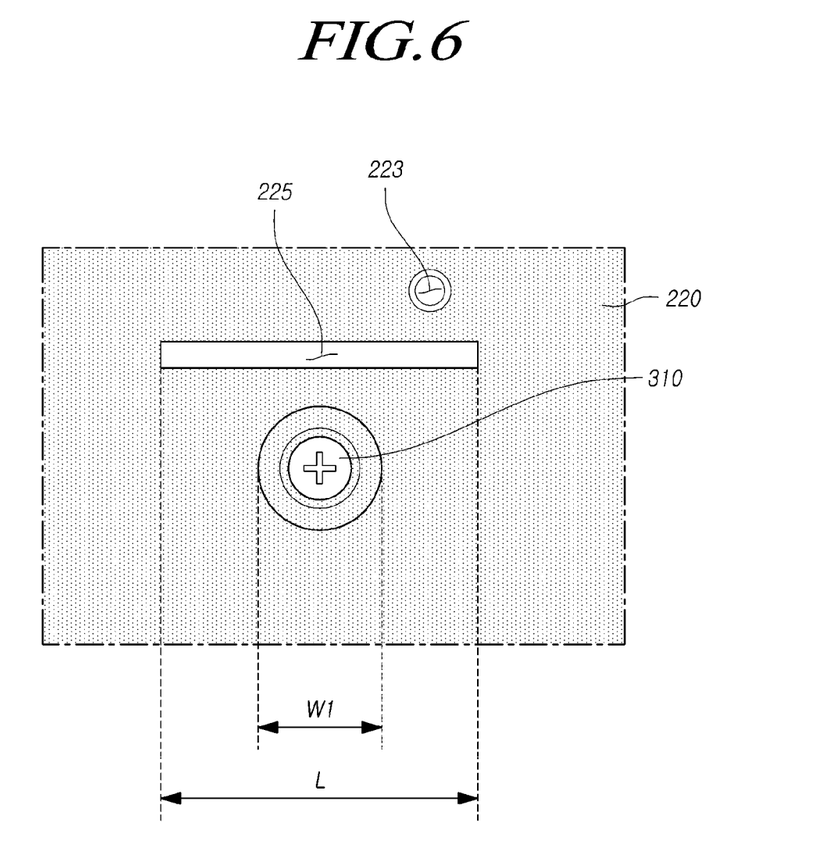
FIG. 6 is an exemplary view illustrating a portion of the configuration of a display device according to embodiments of the present disclosure.
Figure 7:
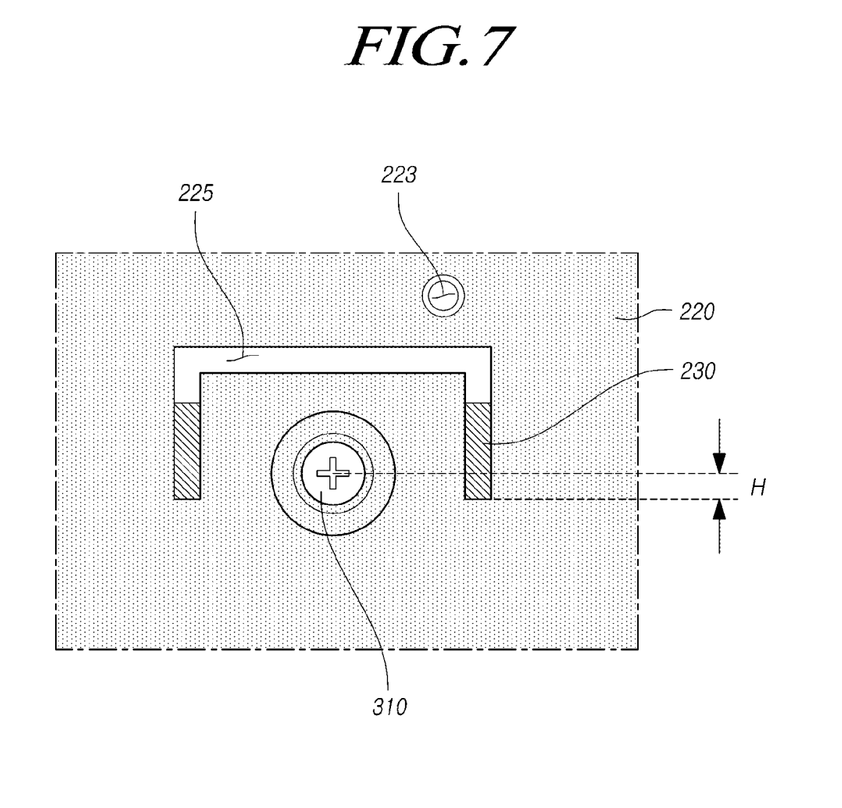
FIG. 7 is an exemplary view differently illustrating a portion of the configuration of a display device according to embodiments of the present disclosure.
Figure 8:
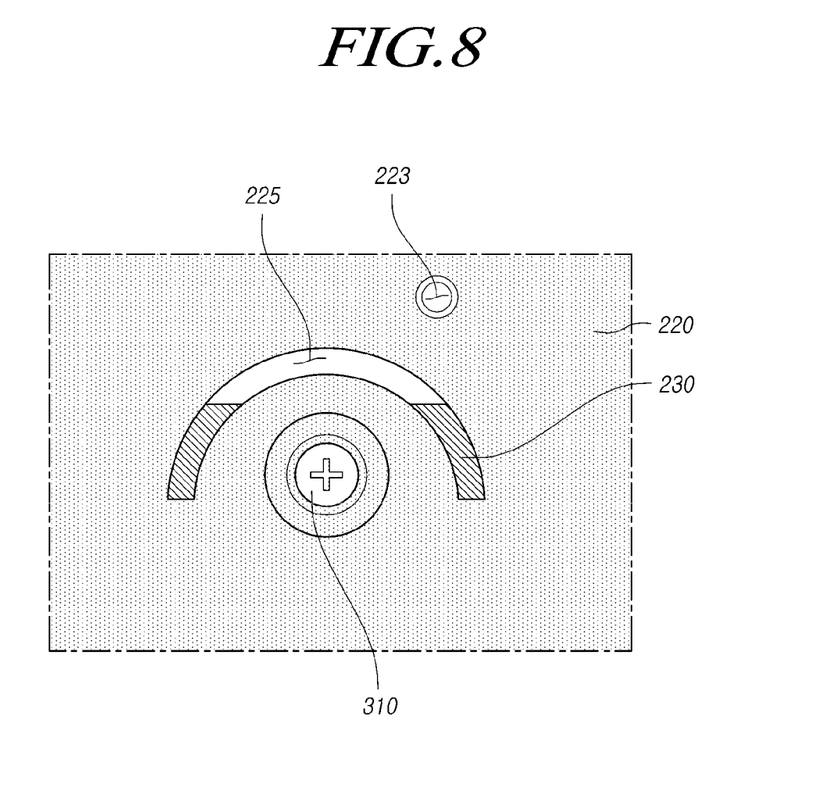
FIG. 8 is an exemplary view differently illustrating a portion of the configuration of a display device according to embodiments of the present disclosure.
Figure 9:
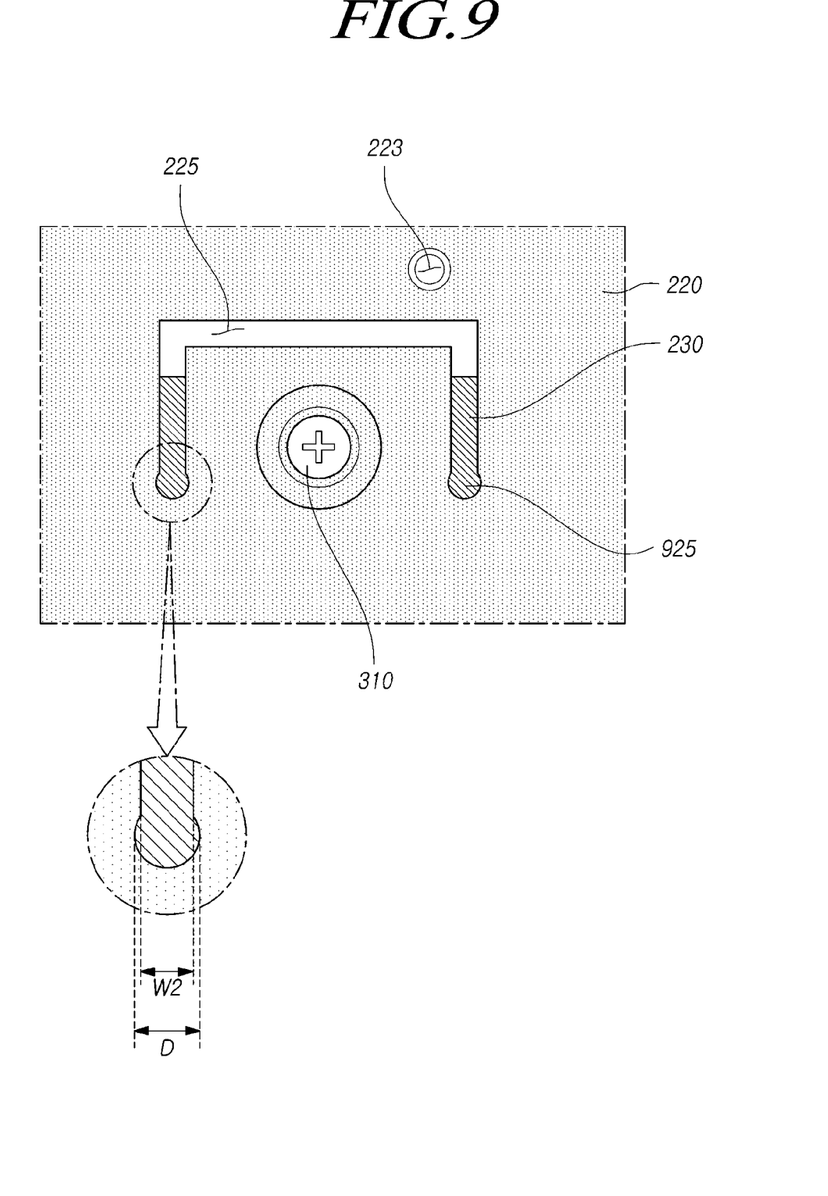
FIG. 9 is an exemplary view differently illustrating a portion of the configuration of a display device according to embodiments of the present disclosure.
Figure 10:
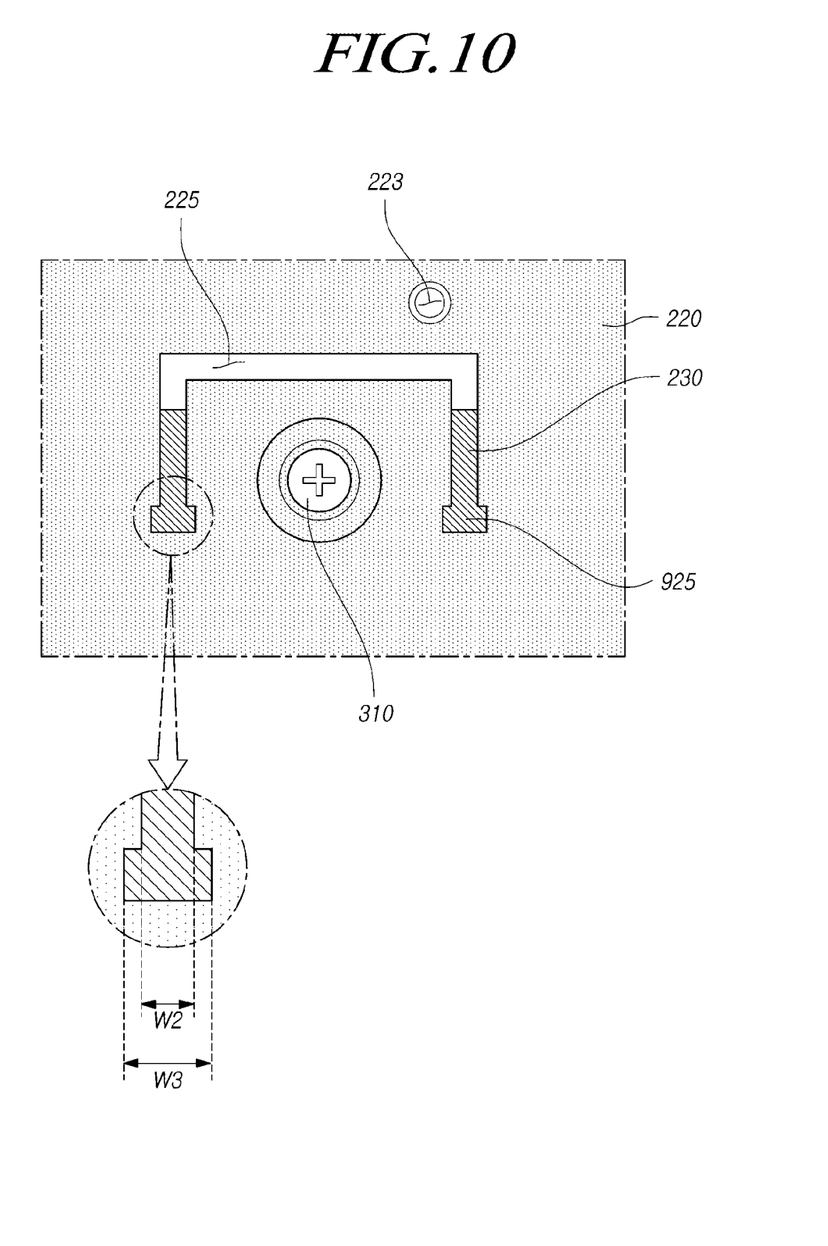
FIG. 10 is an exemplary view differently illustrating a portion of the configuration of a display device according to embodiments of the present disclosure.
Figure 11:
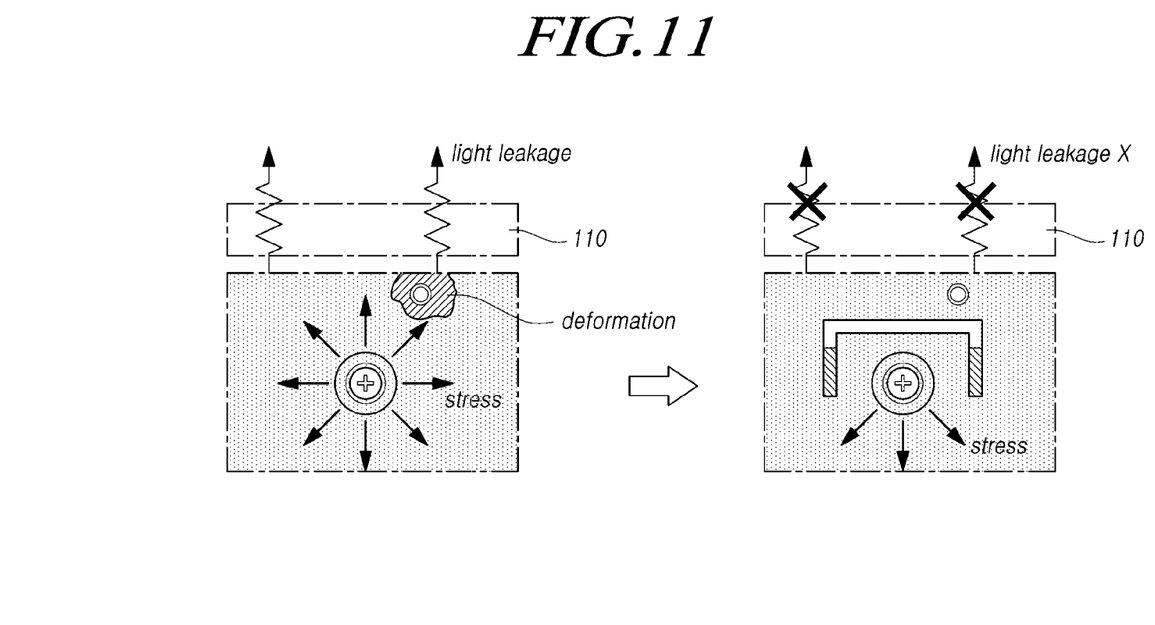
FIG. 11 is an exemplary view conceptually illustrating an effect obtained according to embodiments of the present disclosure.

FIG. 1 is a perspective view illustrating a display device according to embodiments of the present disclosure, FIG. 2 is an exemplary view illustrating a cross section taken along line A-A in FIG. 1, FIG. 3 is an exemplary view illustrating a cross section taken along line A-A in FIG. 1 in the state in which a fastening member is fastened, and FIG. 4 is an exemplary view illustrating a cut surface of a portion of a display device according to embodiments of the present disclosure. FIG. 5 is an exemplary view illustrating an inner portion of a partial region of a display device according to embodiments of the present disclosure, FIG. 6 is an exemplary view illustrating a portion of the configuration of a display device according to embodiments of the present disclosure, FIG. 7 is an exemplary view differently illustrating a portion of the configuration of a display device according to embodiments of the present disclosure, and FIG. 8 is an exemplary view differently illustrating a portion of the configuration of a display device according to embodiments of the present disclosure. FIG. 9 is an exemplary view differently illustrating a portion of the configuration of a display device according to embodiments of the present disclosure, FIG. 10 is an exemplary view differently illustrating a portion of the configuration of a display device according to embodiments of the present disclosure, and FIG. 11 is an exemplary view conceptually illustrating an effect obtained according to embodiments of the present disclosure.

Referring to FIG. 1, when the display device 100 is viewed from the front, a display panel 110 and a case top 120 are identified as in FIG. 1.

The display panel 110 may be configured with one of a Liquid Crystal Display (LCD) device, a Plasma Display Panel (PDP) device, a Field Emission Display (FED) device, an Electro-Luminescent Display (ELD) device, and an Organic Light-Emitting Diode (OLED) display device.

However, for convenience of explanation, a liquid crystal display device, which controls an electric field applied to the liquid crystal layer of the display panel 110 so as to cause light, emitted from a backlight unit to the display panel 110, to be transmitted through the array of liquid crystals while changing the array of liquid crystals, thereby displaying an image, will be described as an example.

The case top 120 is a chassis structure that covers and protects the front rim (i.e., outer edges) of the display panel 110 and the outside of the side portions of the display panel 110.

The case top 120 may be provided by coupling divided side members, which are provided for four edges of the display panel 110, respectively, or may be provided by integrally forming four side members by processing a single plate and then bending the processed single plate.

The case top 120 may be provided with a fifth fastening hole 251 to be described later, but the fifth fastening hole 251 is omitted from FIG. 1.

FIG. 2 is an exemplary view illustrating a cross section taken along line A-A' of FIG. 1, and FIG. 3 is an exemplary view illustrating a cross section taken along line A-A' of FIG. 1 in the state in which a fastening member is fastened.

The cross-sectional structure of the display device 100 will be schematically described with reference to FIGS. 2 and 3.

A cover bottom 220 is provided in a rectangular shape positioned below the display panel 110.

The cover bottom 220 is a constituent element that forms the overall lower surface of the display device 100 and protects the structure of the backlight unit or the like inside the display device 100.

On the rectangular rim of the cover bottom 220, each of one or more vertical side portions may extend from the upper surface of the horizontal cover bottom 220 so as to protect the side surface of a structure, such as a backlight unit or the like.

A light source 210 configured to emit light to the display panel 110 is positioned inside the cover bottom 220.

In one embodiment, the light source 210 of the display device 100 is a Light-Emitting-Diode (LED).

The light source 210 may be disposed in any one of an edge type and a direct type according to the display form of the display device 100.

A side-type liquid crystal display device is provided with a reflective sheet and a light guide plate inside the cover bottom 220. The light source 210 is disposed inside the cover bottom 220 at a side of the light guide plate, an optical sheet 270 is positioned above the light guide plate, and the display panel 110 is positioned above the optical sheet 270.

FIG. 2 illustrates the light source 210 arranged in a direct type. Hereinafter, the light source 210 arranged in the direct type will be described as an example for convenience.

The light source 210 arranged in the direct type may be in the form of a module including a board (PCB) and an LED chip, and is provided on the upper surface of the cover bottom 220 described above.

The optical sheet 270 is configured to uniformly distribute the light of the light source 210, which is a point light source. As shown in FIG. 2, the optical sheet 270 is positioned above the light source 210.

The optical sheet 270 is an optical layer including a diffusion plate, a diffusion sheet, or the like in various forms such as a plate form or a film form, and may be in the form in which a plate or a film is laminated.

In addition, an air gap is formed between the light source 210 and the optical sheet 270.

In a vertical structure, the optical sheet 270 is positioned below the display panel 110, and the light source 210 is positioned below the optical sheet 270.

In addition, a reflector 290 is provided on the top surface of the cover bottom 220, so that the light emitted from the light source 210 toward the display panel 110 can be reflected again to further increase the light emission efficiency of the light source 210.

In addition, a guide panel 240 configured to support the lower portion of the display panel 110 is positioned outside a vertical side portion of the cover bottom 220.

In one embodiment, the guide panel 240 is vertically positioned outside the vertical side portion of the cover bottom 220 and has an inclined surface 243 that protrudes and extends between the end of the vertical side portion of the cover bottom 220 and the display panel 110. The inclined surface 243 is inclined toward the top surface of the cover bottom 220.

In one embodiment, the inclined surface 243 includes a scattering pattern configured to scatter light such that the light incident on the inclined surface 243 from the light source 210 is directed to the display panel 110.

In one embodiment, the rim (i.e., outer edges) of the optical sheet 270 described above may be supported by the guide panel 240 by being positioned between the display panel 110 and a portion of the guide panel 240 that protrudes between the end of the vertical side portion of the cover bottom 220 and the display panel 110.

In one embodiment, the guide panel 240 is supported by including one or more support members 245 extending in a direction normal to the top surface of the cover bottom 220 from the inclined surface 243.

In one embodiment, since the rectangular cover bottom 220 has a structure vulnerable to external torsional force, a reinforcing frame 230 is positioned on the cover bottom 220 so as to prevent the cover bottom 220 from warping due to the external torsional force.

In one embodiment, the reinforcing frame 230 is made of a reinforcing material that prevents deformation or the like of the cover bottom 220 and supports the rigidity of the cover bottom 220.

The reinforcement frame 230 may be made of various materials such as a metal.

In addition, in one embodiment, the reinforcing frame 230 has a bar, a curved line, or various deformed shapes of the bar or the curved line when viewed from the front side. In one embodiment, the reinforcing frame 230 has a horizontal plane corresponding to (i.e., substantially parallel to) the lower surface of the cover bottom 220 when viewed from a lateral side or may further have a vertical side portion corresponding to (i.e., substantially parallel to) the vertical side portion of the cover bottom 220.

In one embodiment, a reinforcing frame 230 is positioned at one or more of the rims of the cover bottom 220 (e.g., opposite side rims or four rims) so as to supplement the rigidity of the cover bottom 220.

In one embodiment, the reinforcing frame 230 is made of the same material as the cover bottom 220, but may be made relatively thicker than the thickness of the cover bottom 220 so as to supplement the rigidity of the cover bottom 220.

In one embodiment, the reinforcing frame 230 has a bent portion, which is bent on the side opposite the vertical side portion. In this case, the reinforcing frame 230 has a stronger structure to withstand external torsional force due to the structure of the bent portion.

When the reinforcing frame 230 has the bent portion, the bent portion of the reinforcing frame 230 may be provided around the support member 245 of the guide panel 240. For example, as shown in FIG. 2, when two support members 245 are provided, the bent portion may be positioned between the two support members 245 so as to avoid interference with the support members 245.

In order to fasten the reinforcing frame 230 and the cover bottom 220 to each other, a first fastening hole 221 is formed in the vertical side portion of the cover bottom 220 and a second fastening hole 231 is formed in the vertical side portion of the reinforcing frame 230. The reinforcing frame 230 and the cover bottom 220 may be fastened in a horizontal lower portion, in addition to the vertical side portion.

A first fastening member 310 is inserted into the first fastening hole 221 and the second fastening hole 231 so that the first fastening member 310 couples the reinforcing frame 230 and the cover bottom 220 to each other. The first fastening member 310 may be a screw, which is a kind of fastening member for securely fastening the reinforcing frame 230 and the cover bottom 220. In this case, the reinforcing frame 230 and the cover bottom 220 may be screw-coupled to each other.

At this time, when the fastening member 310, which is inserted into the first fastening hole 221 and the second fastening hole 231, is coupled, stress is generated around the first fastening hole 221 of the cover bottom 220 due to the fastening force generated due to the coupling.

Due to such stress, a portion of the cover bottom 220 where the first fastening hole 221 is located is more rigid and locally deformed toward the reinforcing frame 230, which is strongly resistant to external force due to the bar shape.

A slit hole 225 is positioned between the end of the vertical side portion of the cover bottom 220 and the first fastening hole 221 so as to prevent deformation of a portion of the cover bottom 220 due to the fastening of the cover bottom 220 and the reinforcing frame 230. The slit hole 225 will be described in detail later.

A third coupling hole 223 for coupling the cover bottom 220 to the guide panel 240 is provided in the vertical side portion of the cover bottom 220 in addition to the first coupling hole 221 for coupling the cover bottom to the reinforcing frame 230.

This third fastening hole 223 is located between the end of the vertical side portion of the cover bottom 220 and the slit hole 225.

In addition, the guide panel 240 is provided with a fourth fastening hole 241 for coupling the guide panel 240 to the cover bottom 220.

The fourth fastening hole 241 is provided in the vertical side portion of the guide panel 240 at a position corresponding to the position of the third fastening hole 223.

In addition, a second fastening member 320 is inserted into the third fastening hole 223 and the fourth fastening hole 241 so as to couple the guide panel 240 and the cover bottom 220 to each other. Like the first fastening member 310, the second fastening member 320 may be a screw, which is one type of fastening member for strongly fastening the guide panel 240 and the cover bottom 220 to each other.

Through the above structure, the cover bottom 220 is fixedly coupled to the guide panel 240, and is also fixedly coupled to the reinforcing frame 230.

At this time, when the slit hole 225 is positioned between the end of the vertical side portion of the cover bottom 220 and the first fastening hole 221, since a portion of the cover bottom 220 is slit due to the slit hole 225, the stress generated due to the coupling of the cover bottom 220 and the reinforcing frame 230 to each other is not transferred to the third fastening hole 223, into which the second fastening member 320 is inserted, and a partial region where the first fastening hole 221 is located is deformed toward the reinforcing frame 230.

Accordingly, since the flatness of the region of the cover bottom 220 where the third fastening hole 223, through which the cover bottom 220 and the guide panel 240 are coupled to each other, is positioned is maintained, the guide panel 240 fastened thereto is capable of supporting the display panel 110 without being deformed, so that it is possible to prevent light leakage at the rims of the display panel 110.

In addition, the case top 120 described above is provided with a fifth fastening hole 251 corresponding to the fourth fastening hole 241 in the guide panel 240, and the second fastening member 320 is inserted into the fifth fastening hole 251, the fourth fastening hole 241, and the third fastening hole 223 so as to couple the case top 120 and the guide panel 240 to each other.

Through this, the case top 120, the guide panel 240, and the cover bottom 220 are fastened to each other, so that the overall chassis structure of the display device 100 can be realized.

Referring to FIG. 4, the vertical side portion of the cover bottom 220 and the vertical side portion of the reinforcing frame 230 are coupled by the first fastening member 310, and the slit hole 225 is provided between the end of the vertical side portion of the cover bottom 220 and the first fastening hole 221.

Referring to FIG. 5, in one embodiment, two fastening structures illustrated in FIG. 4 may be provided for each of the reinforcing frames 230 per corner portion of the cover bottom 220, so that the total number of fastening structures may be eight. However, a greater number of fastening structures may be applied for stronger fastening.

In addition, as described above, one reinforcing frame 230 may be located on each of the four rims of the cover bottom 220. In this case, as illustrated in FIG. 5, the ends of neighboring reinforcing frames 230, which are located in a corner portion of the cover bottom 220, may be provided in the form of being fitted to each other in complementary shapes.

Therefore, in this case, since the vertical side portions of the four rims of the cover bottom 220 are fastened to the respective reinforcing frames, thereby minimizing a local stress effect due to the fastening while being supplemented in rigidity, it is possible to provide a more robust display 100 structure.

A slit hole 225 will be described in detail with reference to FIGS. 6 to 10.

The slit hole 225 is positioned between the end of the vertical side portion of the cover bottom 220 and the first fastening hole 221 and is formed by slitting a partial region of the cover bottom 220.

The slit hole 225 is a configuration for preventing stress, generated due to the coupling of the first fastening member 310 inserted into the first fastening hole 221 and the second fastening hole 231, from being transferred to the upper portion of the first fastening hole 221, i.e., to the third fastening hole 223.

More specifically, the stress generated due to the coupling of the first fastening member 310 is radially spread to the periphery of the first fastening hole 221, and the stress, which is being transferred to the upper portion of the first fastening hole 221 along the cover bottom 220, is no longer transferred at the slit hole 225, since a portion of the cover bottom 220 is slit.

Therefore, the upper portion of the slit hole 225 is not affected by the stress generated by the coupling of the first fastening member 310.

Meanwhile, in order to more effectively prevent the transfer of stress due to the coupling of the first fastening member 310, the slit hole 225 may be provided in a rectangular shape, in which the length L between opposite ends of the slit hole 225 is larger than the width W1 of the first fastening hole 221, as illustrated in FIG. 6.

In this case, compared with the case where the length L between the opposite ends of the slit hole 225 is smaller than or equal to the width W1 of the first fastening hole 221, the stress generated due to the coupling is more reliably prevented from being transferred across the opposite ends of the slit hole 225.

However, in order to prevent the stress generated due to the coupling of the first fastening member 310 from being transferred toward the lateral sides of the first fastening hole 221, in one embodiment, at least one of the opposite ends of the slit hole 225 may be provided in the form of further extending toward a lateral side of the first fastening hole 221, as illustrated in FIG. 7.

At least one of the opposite ends of the slit hole 225 may extend longer to a position below the center of the first fastening hole 221, as illustrated in FIGS. 7 and 8.

That is, at least one of the opposite ends of the slit hole 225 may extend to a position below the center of the first fastening hole 221 by a predetermined length H or more.

In this case, the stress, which spreads to the upper portion of the first fastening hole 221 due to the coupling of the first fastening member 310, is prevented from being transferred to the third fastening hole 223 over the ends of the slit hole 225.

When at least one of the opposite ends of the slit hole 225 extends further to a position below the center of the first fastening hole 221, stress is prevented from being transferred to the lateral sides of the first fastening hole 221, so that the stress can be transferred only to the lower portion of the first fastening hole 221.

Accordingly, it is possible to more effectively prevent the stress, which spreads through the lateral sides of the first fastening hole 221, from being transferred to the third fastening hole 223.

In addition, the slit hole 225 may be formed in various shapes, while at least one of the opposite ends extends to a lateral side of the first fastening hole 221.

For example, as illustrated in FIG. 7, at least one bent portion may be provided in the slit hole 225 in a "U" shape overall.

Alternatively, as illustrated in FIG. 8, the slit hole 225 may be provided in an arc shape or a curved shape having a curved portion. The shape of the curved portion of the slit hole 225 may correspond to the shape of the first fastening hole 221.

However, in addition to the above-described shapes, the slit hole 225 may be formed in various shapes such that opposite ends thereof extend to the lateral sides of the first fastening hole 221.

Meanwhile, the opposite ends of the slit hole 225 may have the shape of a hole 925 that is larger than the width W2 of the slit hole 225.

The holes 925 are provided at the ends of the slit hole 225 in a shape different from that of the slit hole 225 and are configured to prevent the stress, transferred to the ends of the slit hole 225, from being transferred over the ends of the slit hole 225.

More specifically, the stress radially spreading from the first fastening hole 221 is not transferred to the slit portion due to the slit hole 225, but is likely to be transferred through the ends of the slit hole 225, which are not slit.

Therefore, in order to prevent stress from being transferred through the ends of the slit hole 225, holes 925 are further provided in the ends of the slit hole 225 so as to prevent the transfer of stress.

For this purpose, the holes 925 may be provided in a shape different from the slit hole 225, and may have a size that is relatively larger than the width of the slit hole 225.

In one embodiment, referring to FIG. 9, the holes 925 provided in the ends of the slit hole 225 are circular, and assuming that the diameter of the circular holes 925 is D, the diameter D of the holes 925 may be larger than the width W2 of the slit hole 225.

In one embodiment, referring to FIG. 10, the holes 925 provided in the ends of the slit hole 225 are rectangular, and assuming that the length of the long sides of the rectangular holes 925 is W3, the length W3 of the long sides of the holes 925 may be larger than the width W2 of the slit hole 225.

When the holes 925 are provided in the slit hole 225 as described above, unlike the case where the slit hole 225 is simply extended, the stress, radially transferred from the first fastening hole 221, can be more effectively prevented from being transferred over the ends of the slit hole 225.

However, the holes 925 are not limited to a circular or rectangular shape as described above, but may be provided in various shapes that are different from the shape of the slit hole 225 and are formed to be larger than the width W2 of the slit hole 225.

The effect of the display device 100 having a slit hole 225 as described above will be described in detail with reference to FIG. 11. In the case of the cover bottom 220 which is not provided with the slit hole 225, the stress radially spreading around the first fastening hole 221 may be transferred to the third fastening hole 223, so that local deformation may occur in a region of the cover bottom 220 where the third fastening hole 223 is provided.

Since the third fastening hole 223 is a fastening hole for fastening the cover bottom 220 and the guide panel 240, a portion of the guide plate 240 may be deformed due to the deformation of the region of the cover bottom 220 where the third fastening hole 223 is located.

As a result, a gap may be generated between the guide panel 240 and the display panel 110, and light leakage may be caused, in which the light from the light source 210 leaks.

In contrast, when the slit hole 225 is provided in the cover bottom 220, the stress radially spreading around the first fastening hole 221 cannot be transferred to the region where the slit hole 225 is located, so that no local deformation occurs in the third fastening hole 223.

Therefore, leakage of light from the light source 210 can be prevented, thereby improving display performance.

As described above, according to embodiments of the present disclosure, even if a torsion phenomenon occurs in any one portion of chassis structures according to the fastening of the chassis structures, it is possible to prevent the torsion phenomenon from affecting other portions.

According to embodiments of the present disclosure, it is also possible to improve the flatness of the vertical side portions of the cover bottom 220 and to supplement torsional rigidity, thereby preventing light leakage and also improving display performance.

According to embodiments of the present disclosure, it is possible to improve the structural stability of a display device 100 by making the display device include a rigid fastening structure.

As described above, the display device 100 according to embodiments of the present disclosure has been described as being a liquid crystal display device, but the present disclosure is not limited thereto. The display device 100 according to embodiments of the present disclosure may be any type of display device 100, as long as it has a chassis structure such as a lower structure such as the cover bottom 220 and a complementary structure such as a reinforcing frame 230 for supplementing the rigidity of the lower structure and the like. For example, the display device 100 according to embodiments of the present disclosure may be applied to an organic light-emitting display, a plasma display, and the like.

In addition, the above-mentioned cover bottom 220 is a structure located under the display panel 110, and may be a back cover, a rear case, or the like. Further, the reinforcing frame 230 is a structure for increasing the rigidity of the cover bottom 220, the covering performance of the cover bottom 220, and the like, and may be variously modified. The reinforcing frame 230 may also be referred to using various terms. The guide panel 240 is a structure for supporting or protecting the lower portion and/or side surfaces of the display panel 110 together with the cover bottom 220. The guide panel 240 may be variously modified or varied in terms of its function or role. The guide panel may also be referred to using various terms. In addition, the guide panel 240 may exist separately from the cover bottom 220, or may be omitted. In some cases, the guide panel 240 may be integrated with the cover bottom 220.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
a display panel;
a cover bottom located below the display panel, the cover bottom having a vertical side portion, and a first fastening hole in the vertical side portion of the cover bottom;
a slit hole in the vertical side portion of the cover bottom, the slit hole being positioned between an end of the vertical side portion of the cover bottom and the first fastening hole;
a reinforcing frame located above the cover bottom, the reinforcing frame having a vertical side portion and a second fastening hole in the vertical side portion of the reinforcing frame;
a first fastening member coupling the cover bottom and the reinforcing frame to each other, the first fastening member being inserted in to the first fastening hole and the second fastening hole; and
a guide panel configured to support a lower portion of the display panel, and having a fourth fastening hole,
wherein the cover bottom includes a third fastening hole positioned between the end of the vertical side portion of the cover bottom and the slit hole and at a position corresponding to a position of the fourth fastening hole.

2. The display device of claim 1, further comprising:
a second fastening member coupling the cover bottom and the guide panel to each other, the second fastening member being inserted in to the third fastening hole and the fourth fastening hole,
wherein the guide panel is positioned outside the vertical side portion of the cover bottom.

3. The display device of claim 2, wherein the guide panel has an inclined surface that protrudes between the end of the vertical side portion of the cover bottom and the display panel, and is inclined toward a top surface of the cover bottom.

4. The display device of claim 3, wherein the guide panel includes one or more support members extending from the inclined surface in a direction transverse to the top surface of the cover bottom.

5. The display device of claim 3, further comprising:
a case top positioned outside the display panel and the guide panel, the case top having a fifth fastening hole, the second fastening member coupling the case top, the cover bottom, and the guide panel to each other, the second fastening member being inserted in to the third fastening hole, the fourth fastening hole, and the fifth fastening hole.

6. The display device of claim 3, wherein at least one optical sheet is positioned below the display panel, and
wherein a rim of the optical sheet is positioned between the display panel and a portion of the guide panel that protrudes between the end of the vertical side portion of the cover bottom and the display panel.

7. The display device of claim 1, wherein the reinforcing frame has a bent portion which is bent at a side opposite the vertical side portion of the reinforcing frame.

8. The display device of claim 1, wherein a length between opposite ends of the slit hole is larger than a width of the first fastening hole.

9. The display device of claim 1, wherein at least one of opposite ends of the slit hole extends to a lateral side of the first fastening hole.

10. The display device of claim 9, wherein at least one of opposite ends of the slit hole extends to a position lower than a center of the first fastening hole.

11. The display device of claim 9, wherein the slit hole has one or more bent portions.

12. The display device of claim 9, wherein the slit hole has a curved portion.

13. The display device of claim 9, wherein the opposite ends of the slit hole have circular shapes that are larger than a width of the slit hole.

* * * * *

UNITED STATES PATENT AND TRADEMARK OFFICE
CERTIFICATE OF CORRECTION

PATENT NO. : 10,585,303 B2
APPLICATION NO. : 16/184682
DATED : March 10, 2020
INVENTOR(S) : HyunJung Kim Page 1 of 1

It is certified that error appears in the above-identified patent and that said Letters Patent is hereby corrected as shown below:

On the Title Page

Item (57), Abstract:
"A display improves the flatness of the vertical side portions"
Should read:
--A display device improves the flatness of the vertical side portions--.

Signed and Sealed this
First Day of September, 2020

Andrei Iancu
*Director of the United States Patent and Trademark Office*